June 22, 1926.
R. E. GREENE
1,589,687
EQUIPMENT FOR TRUCK BODIES
Filed Feb. 23, 1926   7 Sheets-Sheet 1
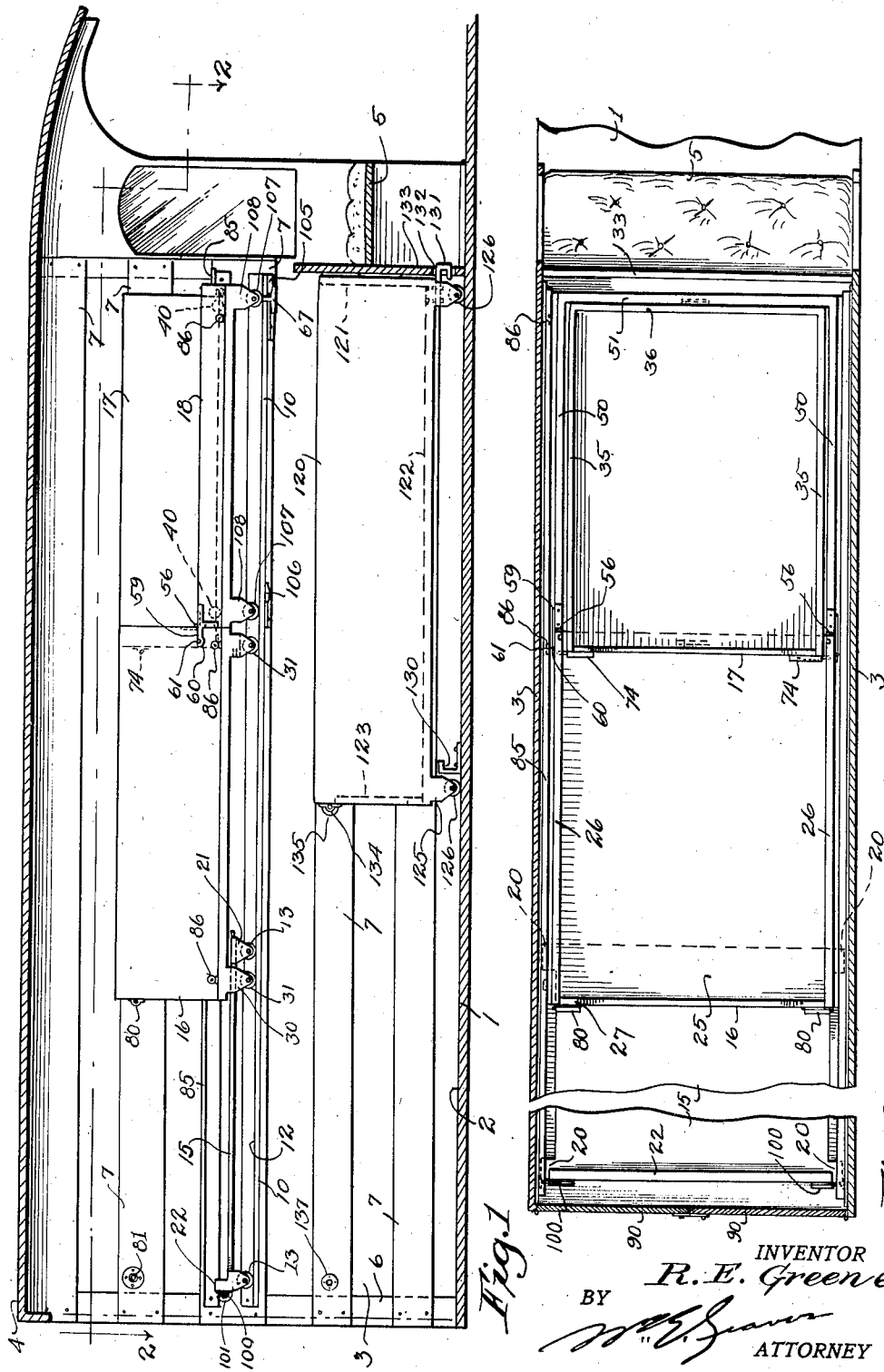
INVENTOR
R. E. Greene
BY
ATTORNEY June 22, 1926.
R. E. GREENE
EQUIPMENT FOR TRUCK BODIES
Filed Feb. 23, 1926    7 Sheets-Sheet 2
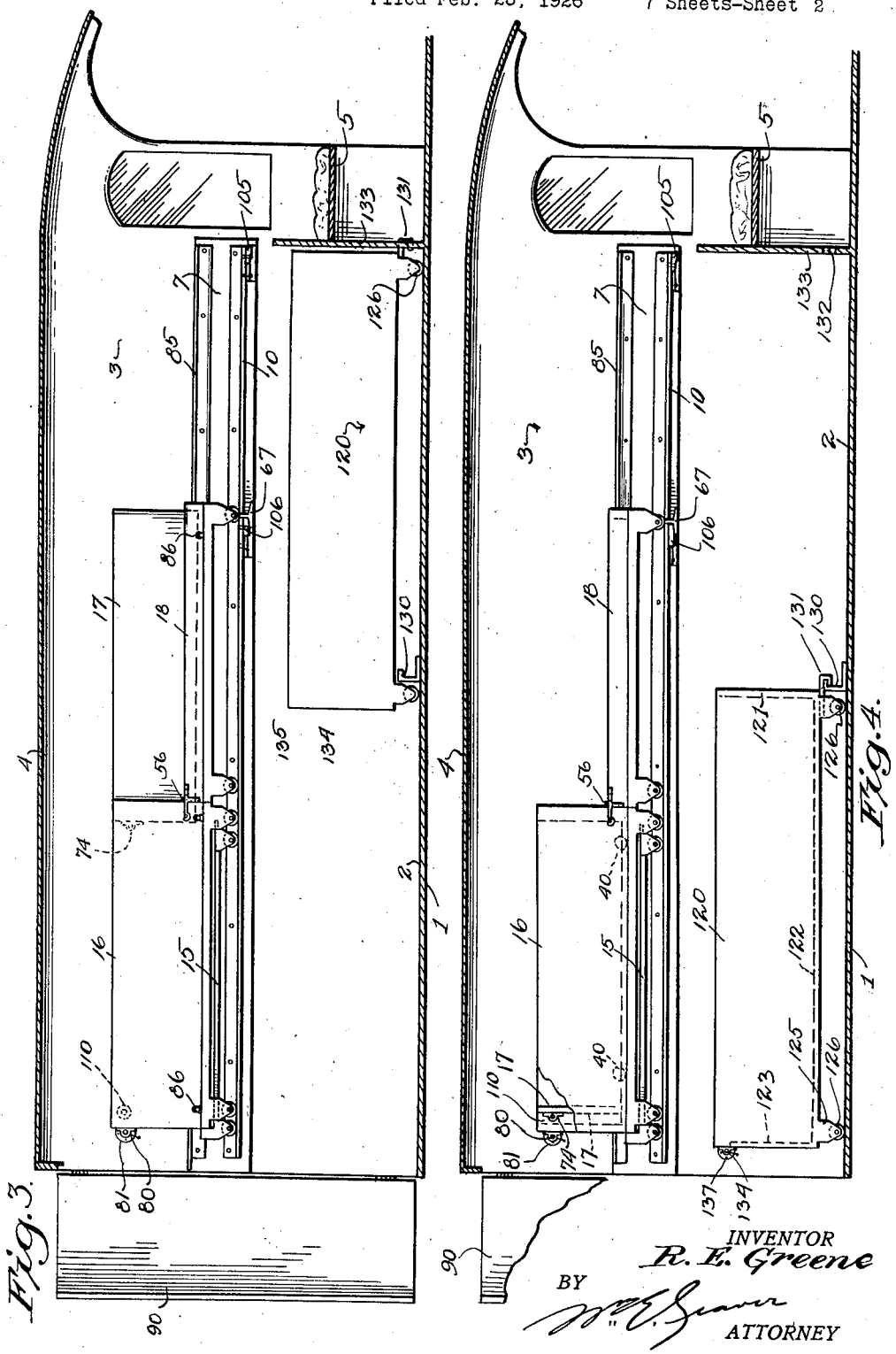
INVENTOR
R. E. Greene
BY
ATTORNEY

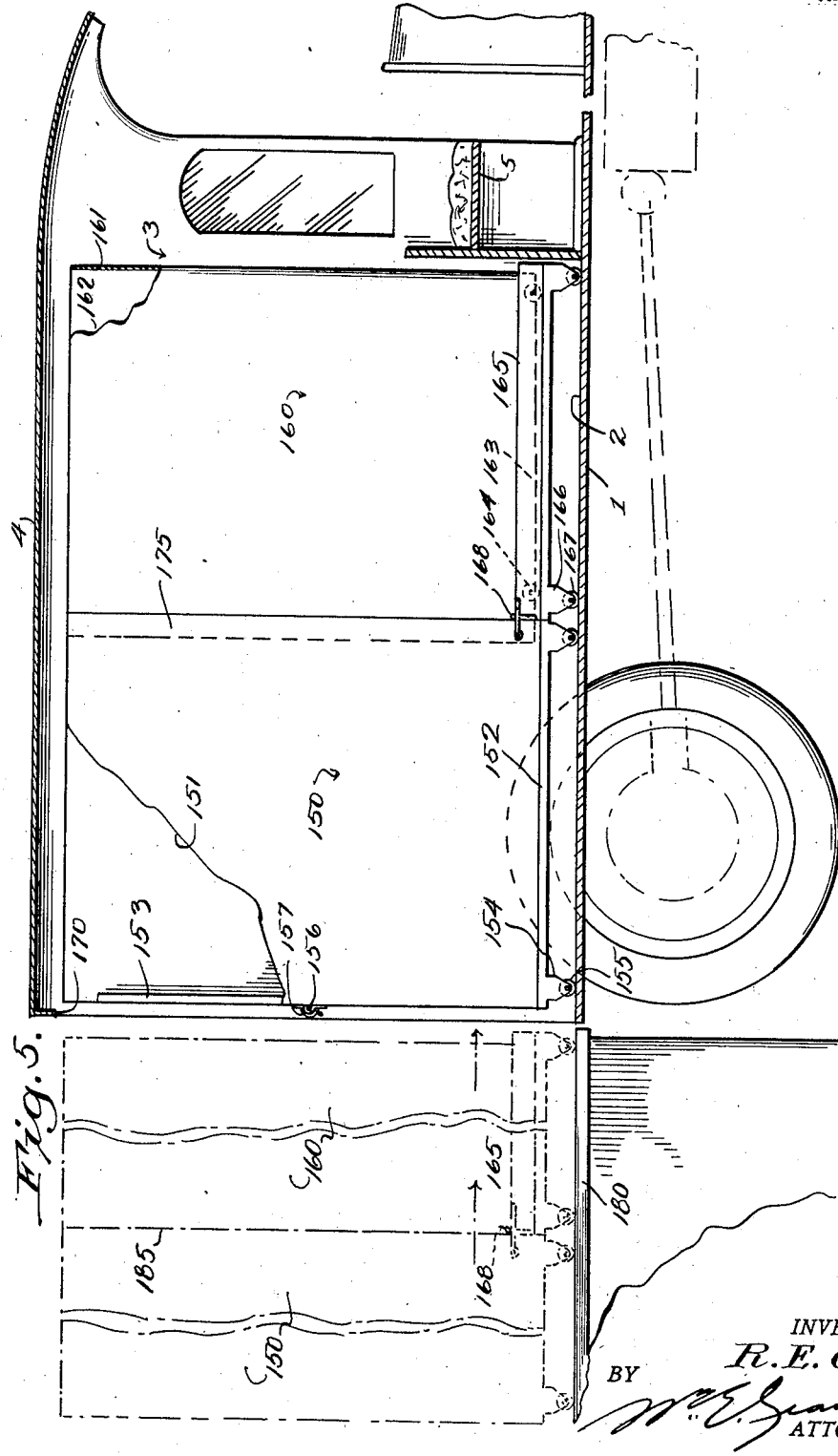

June 22, 1926.

R. E. GREENE 1,589,687

EQUIPMENT FOR TRUCK BODIES

Filed Feb. 23, 1926   7 Sheets-Sheet 4

INVENTOR
R. E. Greene
BY
ATTORNEY

June 22, 1926.
R. E. GREENE
1,589,687
EQUIPMENT FOR TRUCK BODIES
Filed Feb. 23, 1926      7 Sheets-Sheet 5
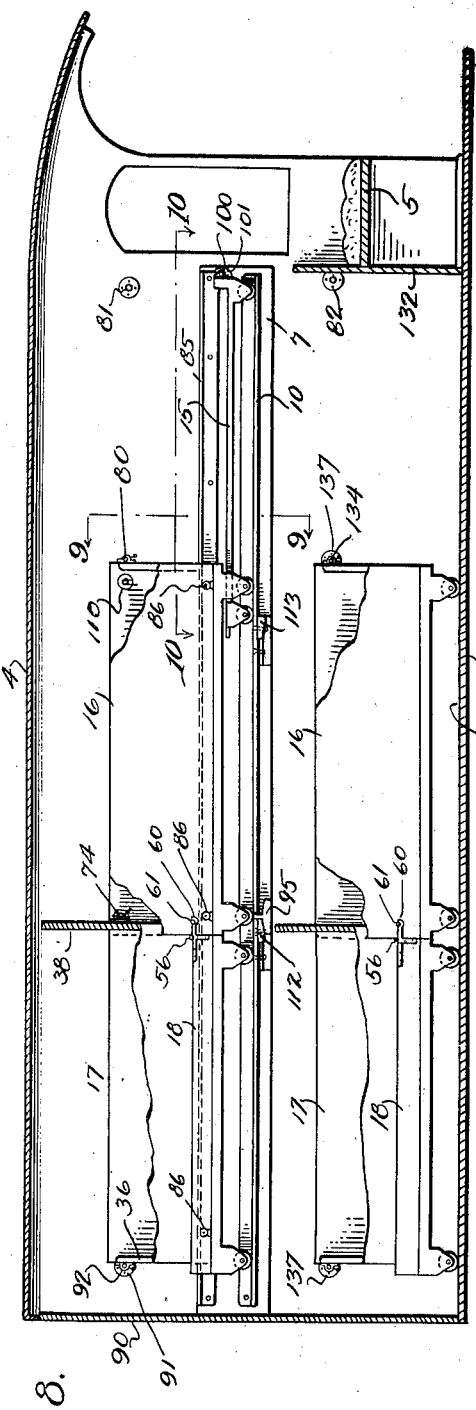
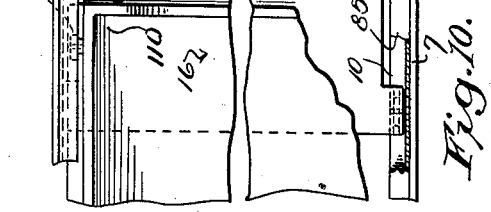
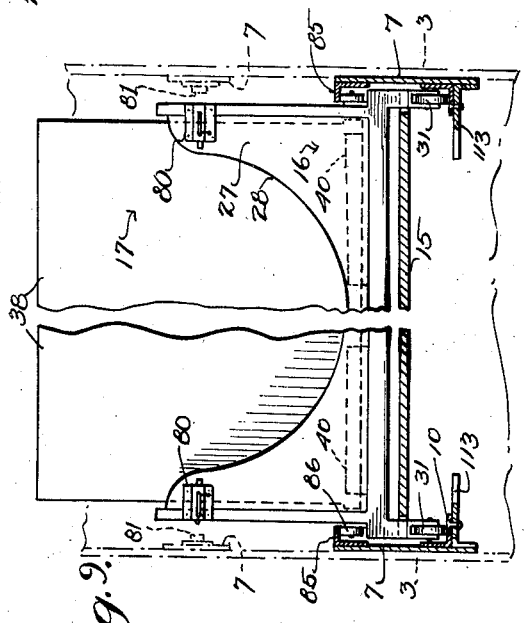
INVENTOR
BY R. E. Greene
ATTORNEY June 22, 1926.
R. E. GREENE
1,589,687
EQUIPMENT FOR TRUCK BODIES
Filed Feb. 23, 1926    7 Sheets-Sheet 6
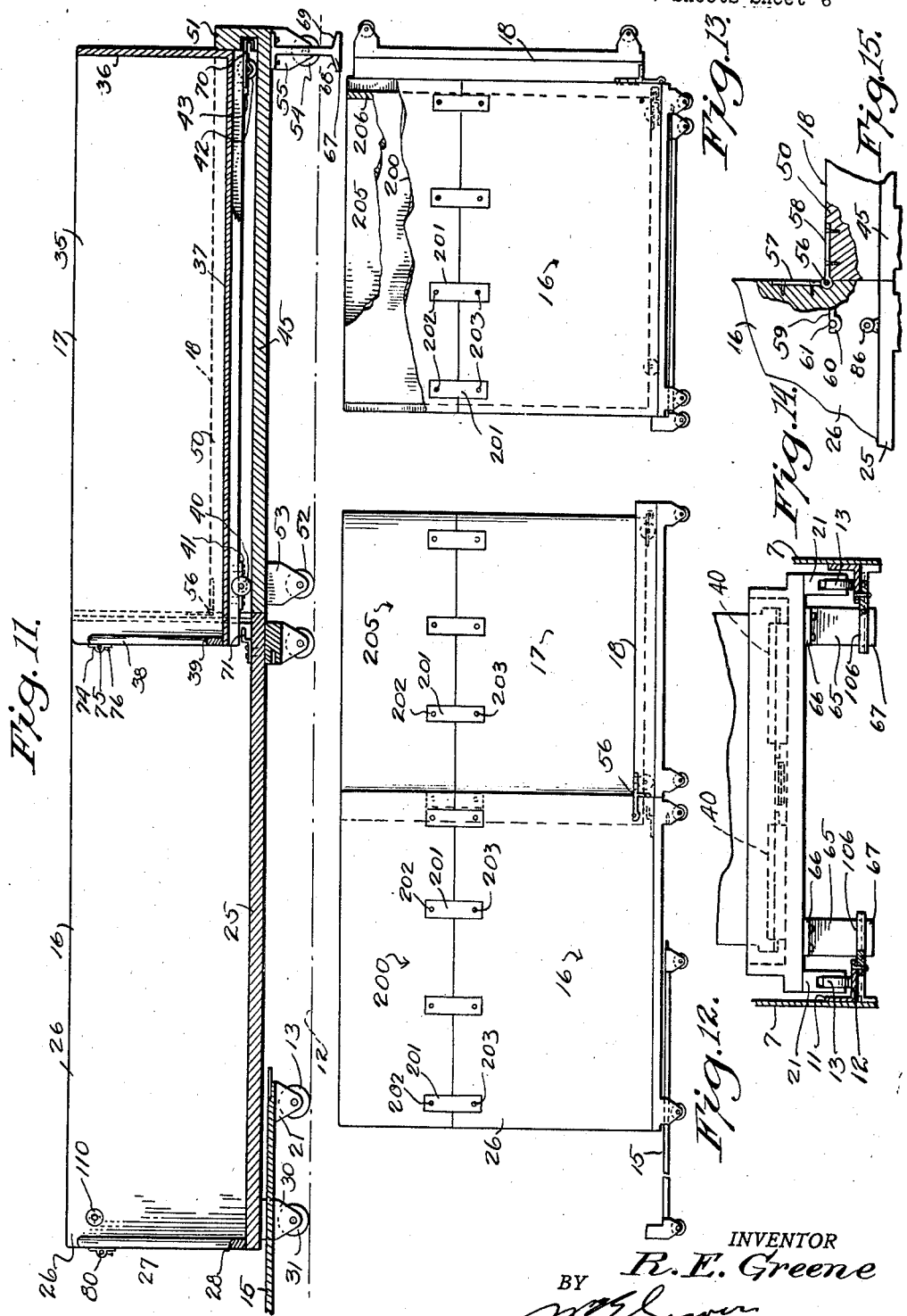
INVENTOR
R. E. Greene
BY
ATTORNEY

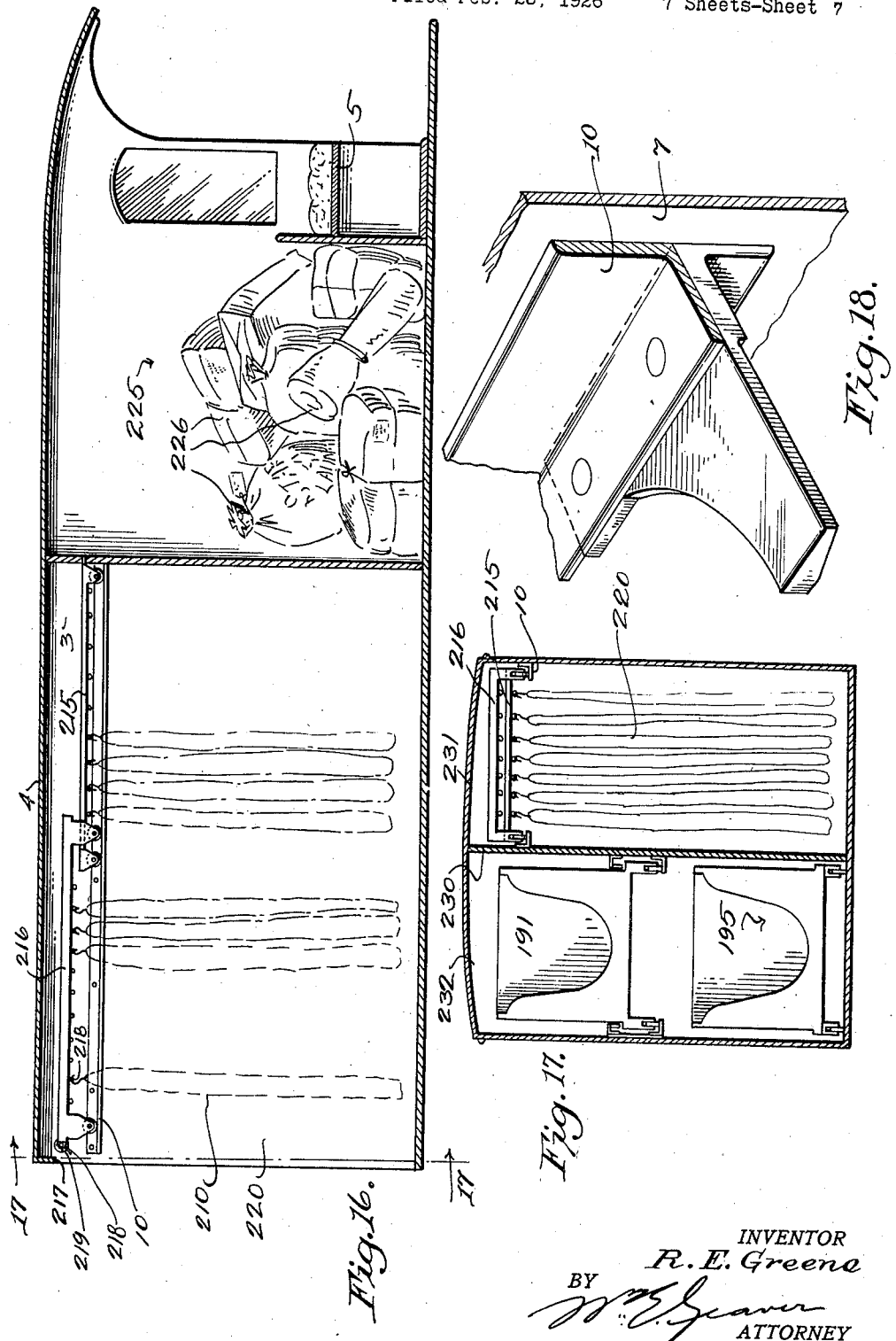

Patented June 22, 1926.

1,589,687

UNITED STATES PATENT OFFICE.

ROBERT E. GREENE, OF DETROIT, MICHIGAN.

EQUIPMENT FOR TRUCK BODIES.

Application filed February 23, 1926. Serial No. 90,037.

This invention relates to equipment for truck bodies and has for its object to provide a method of and means for handling merchandise more efficient in service and economical in use than those heretofore proposed.

With these and other objects in view the invention consists in the novel steps and combinations of steps forming the method, and the novel details of construction and arrangements of parts as will be more fully hereinafter disclosed and particularly pointed out in the claims.

Referring to the accompanying drawings forming a part of this specification in which like numerals designate like parts in all the views;

Fig. 1 is a longitudinal sectional view of a delivery truck to which this invention has been applied;

Fig. 2 is a horizontal sectional view taken on the line 2—2 of Fig. 1 and looking in the direction of the arrows;

Fig. 3 is a view similar to Fig. 1, but showing the parts in slightly different position;

Fig 4 is a view similar to Figs. 1 and 3 but showing the parts in a still further advanced position;

Fig. 5 is a longitudinal sectional view of a delivery truck of a type different from that shown in Fig. 1 and to which the invention may be applied;

Fig. 8 is a view similar to Fig. 1 but illustrating a modified form of the invention adapted to a delivery truck for operation from the opposite end thereof;

Fig. 9 is a transverse sectional view taken on the line 9—9 of Fig. 8 and looking in the direction of the arrows;

Fig. 10 is a horizontal plan view taken on the line 10—10 of Fig. 8 and looking in the direction of the arrows, and with parts broken away;

Fig. 11 is an enlarged detail sectional view of the material handling device illustrated in Fig. 1;

Fig. 12 is an enlarged detailed view of a modification of the invention;

Fig. 13 is a detail view of the parts illustrated in Fig. 12 in folded compacted position for storage purposes;

Fig. 14 is a detail view illustrating the mounting of the rollers, the mounting of the locking wedge, and the parts associated therewith;

Fig. 15 is an enlarged detail view partly broken away illustrating the hinge joint between two of the members of the article carriers;

Fig. 16 is a longitudinal sectional view of a delivery truck to which is adapted a modified form of the invention;

Fig. 17 is a transverse sectional view taken on the line 17—17 of Fig. 16 and looking in the direction of the arrows, and, Fig. 18 is a perspective view of a detail of construction.

Figure 6:
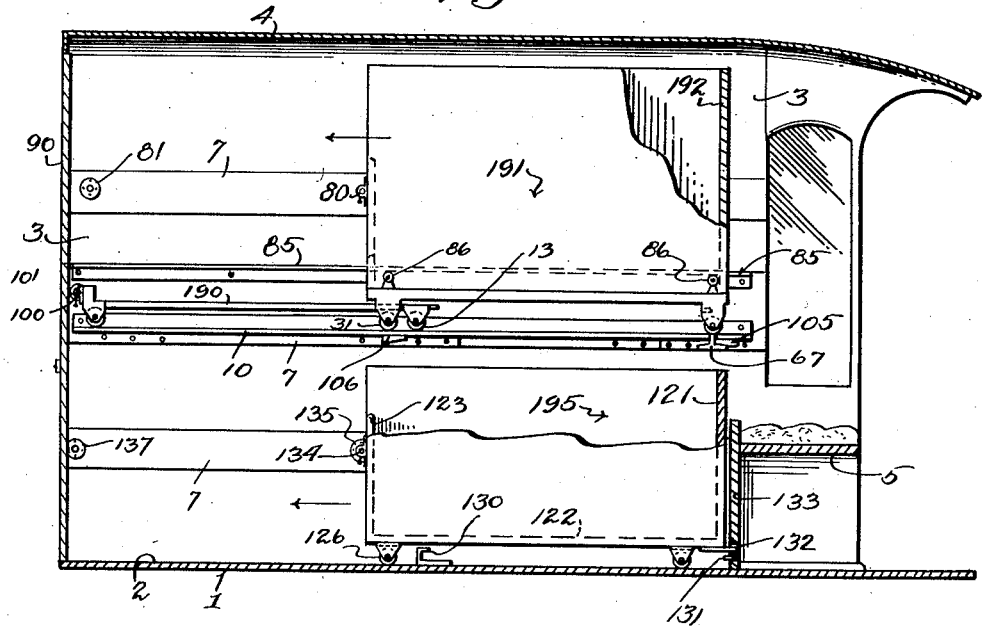
Fig. 6 is a longitudinal sectional view of a delivery truck of the type illustrated in Fig. 5 with a modified form of invention applied thereto.

It will be observed that the figures illustrating this invention are directed to two types of delivery trucks, preferably of the automobile type. That is to say, some of the figures illustrate a relatively long truck body while the other figures illustrate a truck having a much shorter body. The purpose of so illustrating this case is to show the adaptability of the invention to the two types of truck bodies.

Referring to Fig. 1 the truck body is generally indicated by numeral 1 and comprises a floor 2, sides 3, a roof 4 and seat 5. The sides are constructed as usual, in that they have the vertical stay members 6 disposed at regular intervals along the body, but the intermediate stay members omitted from the drawings in order that the invention may be the more clearly illustrated. To the stay members are secured the usual slats 7, all in accordance with the standard automobile truck body construction and as will be readily understood.

The invention consists in, among other things, the disposition of a track member generally indicated by the numeral 10 on either side of the truck body and secured to one of the slats 7. The track 10 may be of any well known construction, but there has been illustrated a track made from angle iron the flange 11 of which is secured to the slat 7 and the other flange 12 of which extends horizontally to form the tread surface for the rollers 13 carried by the device. These rails 10 extend, generally speaking, the entire length of the body portion of the truck.

The article or material carrier forming the real part of this invention comprises in its preferred form the tray member 15, a box member 16, another box member 17 adapted to telescope or slide longitudinally within the box member 16, and a rear member 18 adapted to support the member 17 when the latter is extended from the member 16, see Figs. 1 and 2. The member 15 is a flat tray like member having at its four corners a projection 20 extending laterally from the main body portion of said member, see Fig. 2, and it is to the underside of these projections that the brackets 21 carrying the rollers 13 are secured. There is provided a vertical extension 22 at what may be considered the operating or front end of the member 15 and which may comprise a cleat of any suitable construction or a low partition member as preferred, the purpose of the member 22 being solely to prevent the articles placed on the tray 15 from sliding therefrom.

The box like member 16, see Figs. 1, 2 and 9, comprises the floor 25, two opposite walls 26 and a front wall 27 hollowed out as at 28 to permit easy access to the space within the member 16. Beneath the four corners of the floor 25 there are provided brackets 30 carrying the rollers 31 all as will be clear from the drawings. It is to be noted, however, that the rollers 31 of the member 16 and the rollers 18 of the member 15 are in longitudinal alignment with each other in order that they may roll properly on the tread 12 of the track 10. Further, it will be noted with reference to Fig. 2 that the projection 20 of the member 15 is adapted to cooperate with the bracket 30 of the member 16 in an interlocking position. In other words, the member 15 will not be permitted to move any farther toward the left as seen in Fig. 1 than allowed to by the bracket 30 carried by the member 16, but, on the other hand, the member 15 can be rolled along the track toward the right as seen in said Fig. 1 until the other projection 20 adjacent the stop cleat 22 contacts with the brackets 30 carried by the member 16, the said bracket 30 and the rollers 13 carried thereby being positioned during this travel in the space clearly shown in Fig. 2 existing between the projections 20. It will be noted from Fig. 1 that the projection 20 carried by the member 15 and the bracket 30 carried by the member 16 are of different heights, to permit the floor 15 associated with the brackets 21 to freely pass beneath the floor 25 of the member 16.

Fig. 11 perhaps better illustrates the construction and relation of parts of the members 16, 17 and 18. That is to say, in said figure there is shown the member 16 with a portion of the member 15 extending thereunder, and clearly showing the end partition member 27 with its cut-away portion 28. It will be very clear in said figures that the member 17 comprises a side wall 35 an end wall 36 and a floor 37 supporting the same. The end of the member 17 opposite the wall 36 is provided with a wall 38 similar in every respect to the wall 27 carried by the member 16 and provided with a cut-away portion 39 adapted to facilitate the insertion and withdrawal of articles placed within the member 17. Beneath the floor 37 and adjacent the end thereof to which is secured the end wall 38, there are mounted a plurality of rollers 40 of relatively wide face as by means of the brackets 41, and adjacent the other end of the floor 37 are mounted a plurality of rollers 42, similar in every respect to the rollers 40, said rollers secured to the floor 37 as by means of the brackets 48. With particular reference to Figure 14 it will be observed that these rollers 40 and 42 extend substantially across one half of the bottom surface of the floor 37 of the member 17, so that the said rollers will not materially mar the bottoms 25 and 45 of the members 16 and 18 respectively, yet at the same time amply support the weights to which the member 17 is subjected. In this connection it should be stated that the floors 25 and 45 are in prolongation of each other so that the member 17 may ride smoothly over the upper surface of the said floor without being stopped by the joint between said floors, see Fig. 11.

The member 18 is, generally speaking, provided with low side walls 50 and end wall 51 of the same height, said walls supported by the floor 45. To the underside of the floor 45 and at opposite ends thereof are secured the rollers 52 carried by the brackets 53 and the rollers 54 carried by the brackets 55 secured at the free end of said member 18. With particular reference to Figs. 1 and 15 it will be observed that the member 18 is hingedly secured as at 56 to the member 16. That is to say, there is provided a hinge 56 having the leaves 57 secured to member 16, and 58 secured to the side walls 50 of the member 18. The leaf 58, or that leaf which is secured to the member 18, has an extension 59 having the hook 60 at its end adapted to engage the underside of a pin 61 carried on the outside of the walls 26 of the member 16. The purpose of this hook is to protect the hinge 56 when extra weights are placed on the floor of the member 18 and so prevent the member 18 from becoming disjoined from the member 16. Adjacent the brackets 55 and likewise supported by the floor 45 of the member 18, see Figs. 11 and 14, are a plurality of depending members 65 preferably made of iron, having the securing flanges 66 at the tops thereof and a wedging head 67 at the bottom thereof provided with the inclined surfaces 68 and for a purpose which will presently appear.

Between the rollers 42 carried by the member 18 there is secured to the bottom 37, a hook 70 adapted to engage an upstanding pin 71 fastened to the upper side of the floor 25 of the member 16 to limit the extent to which the member 17 can travel to the left as seen in Fig. 11 and within the member 16, all as will be perfectly clear from the drawings. The end wall 51 of the member 18 is suitably apertured to receive and protect the hook 70, when the member 17 is in the position shown in Fig. 11. Any suitable means of fastening or securing the member 17 in extended position may be used, such as that disclosed in the several figures and particularly illustrated in Fig. 1. Such a means is indicated by the numeral 74 and is shown secured to the end wall 38 of the member 17 and comprises a bolt 75 operable by the handle 76 and adapted to engage an aperture in the end of the side wall 26 of the member 16 to hold the member 17 in the extended position shown in Fig. 11. Another similar fastening means 80 is secured to the end wall 27 of the member 16 comprising a bolt and operating handle therefor, said bolt adapted to engage a suitable socket member as indicated at 81 carried by one of the side slats 7 of the side of the truck, and so positioned as to adapt the member 16 being secured in the position shown in Fig. 3.

Referring to Figs. 1, 2, 8 and 9 it will be observed that there is provided an angle iron 85 extending longitudinally of the body of the truck and positioned over but spaced from the angle irons forming the track 10 for the rollers with which this device is provided. This angle iron constitutes a guard rail against the underside of which bearing rollers 86 carried by the members 16 and 18 are adapted to loosely contact. Thus it will be seen that when the truck is going over uneven ground, the body of the said truck will receive very considerable vertical motion which would be transmitted through the rails 10 to the rollers of the members 15, 16 and 18, tending to bounce said members off the track 10 with more or less detrimental effect. By the employment of the guard rails 85 it will readily be seen that the device constituting this invention may form a substantially integral part of the truck body and the above tendency overcome.

From the foregoing it will be noted that the description thus far has been directed to the construction of an automobile truck body having substantial length, and it will be further observed that in the figures illustrating this invention, the members 15, 16, 17 and 18 have been described as being supported by the track 10 which was shown as being elevated above the floor 1 of the truck, or substantially mid-way the space between the floor and the top of the truck body. Further, the parts referred to and described were shown in such a relation that the member 15 was adjacent the back end of the truck, and the member 18 was adjacent the forward end or the driver's seat 5 of said truck.

With reference to Fig. 8 it will be observed that the truck body is provided with the same track 10, and guard rail 85 mounted upon the slat 7, but the members 15, 16, 17 and 18 have been turned end for end, or in the reverse position in which they are illustrated in Fig. 1. That is to say, the member 15 is adjacent the driver's seat 5, and the members 17 and 18 are shown at the rear of the truck body, with the member 16 disposed substantially in the center of said body. The purpose of this is that some truck bodies are adapted for what is known as "front delivery", and wherein the articles contained in the truck body are taken therefrom over the back of the driver's seat, instead of through the rear doors 90 of the body. Such a condition of affairs might be very desirable in the case of the delivery of valuable matter, to prevent theft thereof through the back doors of the vehicle.

The construction in Fig. 8 is identical with the construction shown in Fig. 1 in so far as the upper equipment is concerned, with the exception that the front wall 38 of the member 17 is extended upwardly to substantially fit the space beneath the roof 4 of the vehicle. Also this wall 38 is made solid as clearly shown in Fig. 9 so as to positively separate the materials carried by the members 16 and 17. Such a partition could be made removable relative to the member 17 for use when there were not many articles to be carried by the members 15 and 16. In other words, in a truck as shown in Fig. 8 there might be a time when there would be but few articles to be delivered and if these articles were spread out over the three members 15, 16 and 17, it would necessitate more labor upon the part of the driver of the vehicle to withdraw the articles when delivering than it would take if all of the articles were confined to the members 15 and 16. Also it might be very desirable to provide such a construction in the case of a truck sent out to not only deliver articles, but to pick up articles as well. That is to say, take for example a laundry truck. The members 15 and 16 could be packed with laundry to be delivered from the front end of the vehicle, and any articles gathered to be returned to the laundry could be positioned in the compartment 17 through the rear doors 90, the partition 38 serving well to keep the articles separated. Thus it will be seen that the members 15, 16, 17 and 18 are adapted to be reversed, and it will be evident that their utility will be very great. In the construction shown in Fig. 8 the socket member 81 is provided adjacent the driver's seat, for engagement by the latch 80 carried by the member 16 when the member 16 is rolled to the right as seen in said figure, and in addition to this there is provided another socket member 91 adjacent the rear doors 90 adapted to be engaged by the latch 92 carried by the rear wall 36 of the member 17 to secure the said member in the position shown in said figure. Another change in this construction is in the disposition of the locking wedge. That is to say, the wedge 67 illustrated in Fig. 11, and secured to the rear end of the member 18 is done away with and the wedge 95 carried by the rear end of the member 16 substituted therefor.

Referring to Figs. 1, 2, 3, 4 and 11 it will be observed that the members 15, 16, 17 and 18 are shown in different positions. In other words, Fig. 1 shows the members 15, 16 and 18 in their full extended positions, and member 17 distended from the member 16 and lying within and supported by the member 18. In this relation of parts, the member 17 is secured as by the latch 74, the member 16 is secured in its position by the latch 80 and the member 15 is secured as by the latch 100 similar to the latch 80 and adapted to engage the socket member 101 carried by the slat 7. The member 18 being hingedly secured to the member 16 is positioned as shown. The latch 100 prevents the vertical movement of the free end of the member 15; the member 16 itself prevents the substantially vertical movement of the other end of said member 15; the latch 80 and the guard rail 85 prevent the vertical movement of the member 16; the latch 74 prevents the vertical movement of the end of the member 17 to which the latch is secured; the aperture in the end wall 51 of the member 18 receiving the hook 70 carried by the member 17 prevents the vertical movements of the end of that member; and the guard rail 85 prevents the vertical movement of the free end of the member 18 by its coaction with the rollers 86 carried by said member. However, to better aid in the prevention of the vertical movement of the free end of the member 18, there is provided the locking wedge 67, see Fig. 11, carried thereby. As disclosed above, this member 67 is provided with the two cam surfaces 68 and 69 which are adapted to engage with cam surfaces carried by the wedging pins 105 secured to the end of the track 10 adjacent the driver's seat, see Fig. 1, when the parts are in their full extended position as shown, and the wedging pin 106 when the parts are in the position shown in Fig. 3. The wedging action will be very evident from the drawings, but may be stated as involving the rollers 107 carried by the member 18, and adapted to traverse the track 10, the cam surfaces carried by the members 67 in turn carried by the said member 18, and the cam surfaces of the wedging pins 105 and 106 carried by the track 10 and slot 7. The rollers 107 are carried by the brackets 108 similar to the bracket 30 carried by the member 16, and the said brackets 108 are rigidly secured to the floor of the member 18. The outer side of the carrier member 18 is likewise provided with bearing rollers 86 to engage the under surface of the guard rail 85.

Fig. 3 shows the parts illustrated in Fig. 1 in the first step of contraction subsequent to certain deliveries having been made. That is to say, Fig. 1 shows the parts in extended position and adapted to contain the articles to be delivered, said articles being piled in the member 17 for those points farthest removed from the start of delivery, the member 16 piled with those articles to be delivered at points at a less distance, and the member 15 piled with those articles to be delivered to the nearest addresses or points in the route of the truck. In Fig. 3 it will be observed that all of the articles contained in the member 15 have been delivered, and it is desired that the next stop of the truck be at a point to deliver an article contained in the compartment 16. The driver of the truck has therefore unlatched the member 100, rolled the member 15 back under the member 16, see Fig. 1, unlatched the member 80 secured to the member 16, and pulled toward the rear doors 90 the combined members 15, 16, 17 and 18 with their load, thereupon he moves the bolt of the latch 80 to engagement with the socket 81 provided therefor adjacent the rear doors 90. This then makes the articles contained in the compartment 16 easily accessible through the rear doors 90. It will be observed that the parts are so dimensioned that when they are in the position shown in Fig. 3, the wedging head 67 will have been removed rearwardly of the truck so that the cam surface 68 thereof will engage the cam surface of the stationary wedging pin 106 and thus secure the member 18 against vertical movement.

When the articles from the member 16 have been delivered, then the parts are moved into the position shown in Fig. 4. That is to say, the driver of the truck reaches in and pulls the member 17 toward the rear doors 90 where the same may be secured as by the latch 74 engaging the socket member 110 carried by the member 16, the parts 15, 16 and 18 remaining in their former positions, and the articles in the carrier member 17 will then be easily accessible from the rear of the truck.

The operation of the parts illustrated in Fig. 8 are substantially the same as just described, inasmuch as the parts are substantially reversed. In other words, when the articles carried by the member 15 have been delivered, the member 15 is rolled under the member 16, and the combination of carrier members rolled to the right as seen in said figure, after disengaging the latch 92 carried by the member 17 and the parts secured in their new forward position as by the latch 80 engaged with the socket member 81. During this movement the wedge head 95 carried by the member 16 will have moved toward the right as seen in said figure out of disengagement with the wedging pin 112, and will engage with the other wedging pin 113. As was the case above described, these wedging pins 112 and 113 are so positioned on the track 10 that they will be engaged by the head 95 when the member 16 is in either the position shown in Fig. 8 or its new position adjacent the driver's seat 5. Likewise as above described when the articles have been delivered from the member 16, the member 17 may be telescoped into the member 16 and the latch 74 carried by the member 17 engaged by the socket member 110 to secure the parts in said telescoped position, thereby giving more space in the rear of the truck for the receipt of articles to be put there.

With reference to Figs. 1, 3 and 4 it will be observed that the floor space of the truck has been adapted to better facilitate the delivery of articles placed therein. That is to say, there is provided in the bottom portion of the truck a carrier member 120 similar to the member 16 in that it comprises two side walls, a solid rear wall 121, the bottom 122 and a front partition 123 which is cut away as was the front wall 27 of the member 16. The carrier member 120 is, however, approximately one-half the length of the storage space of the truck body, and is provided at the four corners thereof with depending brackets 125 carrying the rollers 126. These rollers are not provided with a track to roll on, but are adapted to roll over the floor surface 2 of the bottom 1 of the truck. To prevent the member 120 from rolling out through the rear doors 90, there is provided an upstanding lug 130 secured to the floor of the vehicle and adapted to engage a hook 131 secured to the underside of the member 120 at the end thereof containing the back wall 121 all as clearly shown in Fig. 1. Thus it will be seen that any movement of the member 120 to the left as seen in said figure will be ultimately stopped when the hook 131 carried thereby engages the lug 130 carried by the floor 1 of the truck. The member 120 is further provided with a latch member 134 similar to the latch 80 carried by the member 16, and adapted to engage with the socket member 135 secured to one of the slats 7 to hold the carrier member 120 in the position shown in Fig. 1. A suitable aperture 132 is provided in the back wall 133 associated with the driver's seat 5, for the hook 131.

By providing the construction in the lower part of the truck body disclosed in Fig. 1, articles of larger size can be successfully handled, in that the entire space from the floor surface 2 of the truck to the floor of the carrier member 15 can be utilized. In Fig. 4 the carrier member 120 is shown located in the rear portion of the truck body where it may be secured by the latch member 134 engaging the socket member 137 provided adjacent the rear doors 90, in order that the articles carried by the member 120 may be the more easily reached for delivery. In this connection it might be stated that the reason for making the member 120 longer than the members 15, 16 and 17, is that the driver of the truck can reach farther into the truck body at the lower level in which the carrier member 120 is adapted to move, than he can in the upper level where the said members 15, 16 and 17 are located.

With particular reference to Fig. 8 there is disclosed a modification of the construction shown in Fig. 1, in that the floor level of the truck body is provided with a plurality of carrier members instead of the single one shown in said Fig. 1. In other words, there is provided a carrier member similar to the carrier member disposed in the elevated level of the body shown in Fig. 8, that is to say, there is provided a member 16 similar in all respects to the member 16 above, and likewise there are provided the members 17 and 18 similar in all respects to the members 17 and 18 shown above. However, there is not provided the member 15, for the simple reason that the floor 2 of the truck body serves as a supporting plane for the articles placed between the driver's seat 5 and the member 16. Also the depending wedge member 95 associated with the member 16 in the elevated level has been omitted from the member 16 in the lower level, because there is no track necessary for the carrier member adapted to travel on the floor of the truck body.

Figure 7:
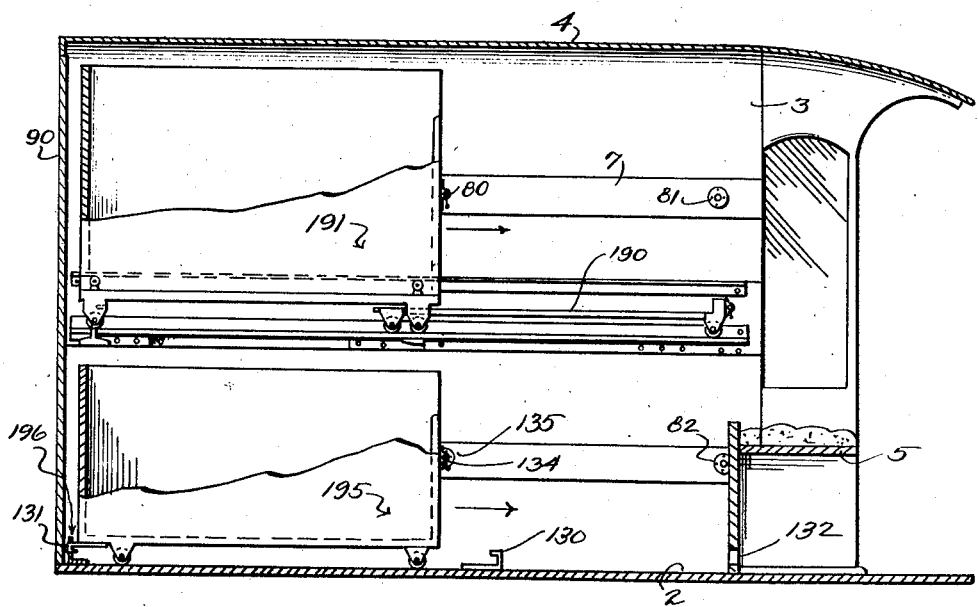
Fig. 7 is a view similar to Fig. 6 with the parts in a different position.

Referring to Figs. 5, 6 and 7 there is shown an adaptation of this invention to a truck having a relatively short body, and in which 1 indicates the bottom of said truck, 2 the upper floor surface thereof, 3 the sides, 4 the roof, 5 the driver's seat and 90 the rear doors of the vehicle, the same as heretofore described.

Referring more particularly to Fig. 5 there is disclosed a carrier member 150 having the sides 151 the bottom 152 and a front partition 153 similar in all respects to the corresponding elements of the carrier member 16 heretofore described, said partition 153 having a suitable cut-away portion of convenient dimensions, to permit the driver of the truck to have easy access to the articles contained in said carrier member 150. This member 150 is likewise provided with the depending corner brackets 154 for supporting the rollers 155 adapted to traverse the upper surface 2 of the floor 1 of the truck body, and a suitable latch 156 carried by the partition 153 is adapted to engage the coacting socket member 157 carried by the sides 3 in the same manner as the corresponding parts described above. Likewise there is provided the carrier member 160 having the end wall 161 and the sides 162 and floor 163 supporting the bearing rollers 164 the same as the corresponding parts of the carrier member 117 heretofore described. Lastly, there is provided the carrier member 165 provided with the depending corner brackets 166 to support the bearing rollers 167 and hinged as at 168 to the member 150 exactly like the carrier member 18 with the exception that the member 165 is not provided with the depending wedge member 67. However, the members 150 and 160 are of such height as to extend to and just pass under the upper limit 170 of the opening for the rear doors 90 which are not, however, shown in Fig. 5 for the purpose of more clearly illustrating the invention.

The purpose of the construction shown in Fig. 5 may be evident from said figures, but may be briefly stated as follows. There are two of the carrier units, each unit comprising the members 150, 160 and 165, for each truck body, one unit always being in the shipping department of the store or other establishment in order that the same may be loaded with articles to be delivered while the other unit is in the truck out on its route delivering the articles in said last named unit. Thus when the unit generally indicated by the reference numeral 175 is emptied of its articles just having been delivered, returns to the store, the same is easily rolled out of the truck body onto a loading and unloading platform 180 usually provided at the store in connection with truck delivery. The second unit generally indicated by the numeral 185 and shown in dashed lines in Fig. 5, which has been loaded with articles to be delivered, is then rolled in the direction of the arrows into the truck body from which the first and empty unit has been taken and the truck is then ready to start its next trip of delivery. Thus it will be seen that by the employment of duplicate units, the full 100% efficiency of the fleet of delivery trucks can be obtained, inasmuch as no one truck will have to stand idle at the store while being loaded with articles for delivery as is the present practice. Also it will be evident that by employing duplicate units of article carriers, it may very well be possible to reduce the number of trucks now found necessary to handle store deliveries, as well as reducing the number of drivers therefor. In this connection, delivery sheets or route sheets may be provided by the shipping department of the store to the driver of the truck to better facilitate the expeditious delivery of the articles contained in the carrier unit. In other words, the time now found necessary and occupied by the driver of the truck in making up his routing list will be saved and therefore the parking time of the truck while said list is being made up will likewise be saved. Another feature is to be found in the fact that by having the units prepared by the shipping department and therefore the almost constant use of the truck assured, more frequent trips can be made by a truck utilizing this principle and therefore smaller trucks can be used with this additional saving of expense.

Fig. 6 is very similar to Fig. 1 in that it discloses a truck body of the same type but shorter than the truck body in Fig. 1. It is therefore equipped with but two carrier members in the upper level and adapted to traverse the track 10 carried by the slats 7 on the sides 3. These carriers comprise the members 190 and 191 which are exactly the same as the members 15 and 16 except as to the dimensions, and the fact that the member 191 is provided with a solid rear wall 192 because there is no third member adapted to telescopically move into and out of said member 191. The other similar features of these members are designated by the same reference numerals as given in Fig. 1. It is to be observed that the wedge member 67 is carried by the member 191 exactly for the same purposes as was the wedge member carried by the carrier 17.

Likewise, Fig. 6 discloses a carrier member 195 which, except for dimension, is exactly similar to the carrier member 120 illustrated in Fig. 1, and also adapted to traverse the upper surface 2 of the floor 1 of the truck. It is to be observed, however, that a keeper 196 is disposed adjacent the rear doors 90, on the floor of the truck, and provided with an aperture to receive the hook 131. The purpose of this construction is to prevent the vertical displacement of the carrier 195 when the truck is travelling over rough ground. The aperture 132 at the driver's seat prevents similar displacement when the member 195 is reversed. Also it is to be observed that the same features in Fig. 6 are referred to by the same reference characters as in Fig. 1, and therefore need no further description.

Fig. 7 illustrates the parts shown in Fig. 6 in reversed position, that is, adapted for delivery of articles from the front of the truck body instead of from the rear, and therefore is similar to Fig. 8 with the exception of dimension, and therefore hardly any more description is necessary for this figure. But in this figure, as in Fig. 6, it is to be noted that there are only two carrier members, 190 and 191 employed in the upper level, thus doing away with the members 17 and 18 shown in said Fig. 8. Also it is to be noted that there is provided a socket member 82 adjacent the driver's seat adapted to be engaged by the latch member 134 on the carrier member 195 to secure this said carrier member in the forward end of the truck body.

Referring to Figs. 12 and 13 there is disclosed a feature of this invention which is very important. That is to say, a store will buy these article carriers in considerable numbers, and keep a great plurality of them in storage for replacement of those broken in handling, etc. It is therefore desirable to so construct the individual carrier members so that they will take up the least possible space in storage.

To this end and with reference to Figs. 12 and 13 it will therefore be readily seen that the member 15 is adapted to be rolled beneath the member 16, and that the member 17 is adapted to be telescoped into the member 16, and finally the member 18 may be rotated about the hinge 56 into the vertically disposed position illustrated in Fig. 13. Thus in storage a unit comprising the four members 15, 16, 17 and 18 will occupy but very little more space than the unit 16 by itself. In other words, the member 17 is made of such dimension as will enable it to lie wholly within the member 16, and the member 18 is made with side walls of little or no height so that said member will support and retain the member 17 when projected from the member 16.

Figs. 12 and 13 further illustrate another feature of the invention. In other words, truck bodies of varying height are common, and also different stores may desire to have the article carriers of variable heights. Therefore this invention provides that the side walls of the members 16 and 17 shall be of such a standardized height as will make the top edges thereof lie in substantially the same horizontal plane, said height being normally sufficient for the average purposes of delivery. However, it is a feature of this invention to provide standardized extensions to the members 16 and 17, and therefore the extension 200 is provided having the countersunk plates 201 secured thereto as by the screws 202, said extension and its associated plates or cleats adapted to be secured to a side wall 26 of the member 16. For this purpose the outer surface of the side wall 26 is provided with corresponding recesses to receive the extending portions of the plates 201, which are then secured to the walls 26 as by the screws 203. In similar manner the side walls 35 of the member 17, and if desired the rear wall 36 thereof, are provided with recesses or countersunk portions to receive the extending ends of similar plates or cleats secured as by the screws 202 to the extension wall 205 which is similar in all respects to the extension wall 200 provided for the member 16. However, the extension walls 205 are joined by the member 206, see Fig. 13, which constitutes an extension of the rear wall 36 of the member 17. The extension walls 205 and 206 are rigidly secured to the side walls of the member 17 as by the screws 203. Only one extension has been illustrated in these figures, but it is understood that if desirable more extensions can be added to build the entire side wall of the carrier members to as great a vertical height as is necessary, and that further, the same means of fastening the plurality of extensions together will be used as is used for securing the extensions 200 and 205 to the side walls of the carrier members 16 and 17.

With reference to Figs. 16 and 17 there is illustrated a further feature of the invention wherein it will be seen that the side wall members of the article carrier 16 may be dispensed with when it is desired to use a carrier unit as illustrated in said figures. That is to say, there is provided the usual track 10, but it is so positioned on the side wall 3 of the truck as to enable dresses, overcoats, suits, etc., contained in the usual protective bag coverings 210 to be supported from the article carriers without having to fold or otherwise crease the said garments. Stated in other words, track 10 is positioned near the roof 4 of the truck, or at such a distance below said roof as will just enable the article carrier 215, similar to the article carrier 16, to be inserted and removed from the track through the upper limit 217 of the rear door of the truck. The undersides of the members 215 and 216 are provided with a plurality of hooks 218 which may be engaged by the hook portion of the garment hanger now in general use and upon which the garment and the bag covering 210 thereover are supported, all as will be clear from the drawings. The member 215 is adapted to roll beneath the member 216 on the track 10 just as the member 15 rolled under the member 16 above described. Also the member 216 has at the rear end thereof a suitable latch 218 adapted to engage the socket member 219 therefor and secured to the side of the truck exactly as did the latch member 80 of the article carrier 16 engage the socket member 81 provided therefor.

In the particular adaptation shown in Figs. 16 and 17, substantially two-thirds of the length of the truck body is utilized as a compartment for hanging the clothes, etc., which have been cleaned and made ready for delivery and indicated by the general numeral 220, and the remainder of the truck body has been reserved as an open compartment for the reception of articles to be collected by the truck driver and taken back to the cleaning or other establishment. In Fig. 16 this last mentioned compartment is indicated by the numeral 225 and the articles collected is shown by the numeral 226. Fig. 17 shows a further adaptation of the invention disclosed in Fig. 16 in that there is provided a substantially central longitudinal partition 230 dividing the truck body into one-half 231 in which is disposed the article carriers 215 and 216 adapted to support the garments 220, and the other half 232. This portion of the truck body 232 may be provided with a construction similar to any of the previously described constructions, as indicated. That is to say, there may be provided a construction similar to that shown in Fig. 6 wherein on the lower level there is located the diagrammatically shown article carrier 195, and in the upper region of said compartment 232 there is diagrammatically illustrated an article carrier 191, but of course it will be understood that any other constructions that are deemed desirable may be used.

Referring to Figs. 1 and 4, and to the above description, it will be remembered that as the articles were delivered, the members 16, 17 and 18 were successively moved toward the rear of the truck in order to make the articles carried therein more accessible to the driver of the truck from the rear doors 90. If the truck is to be loaded for a subsequent delivery without removing the carrier members therefrom, then the positions of the several carrier members will be as indicated in Fig. 4. That is to say, all of the carrier members will be disposed as near the rear doors 90 as they can. The articles or packages to be delivered at those points most remote in the routing of the truck are then placed in the back of the member 17, or the right hand end as seen in said Fig. 4, and when said member 17 is completely filled with articles, then its latch 74 is unfastened and the carrier member is rolled out of the carrier member 16 back into the carrier member 18, and the latch 74 then operated to secure the member 17 in its new position. Then articles are applied to the carrier member 16 in the order of their delivery, with those to be delivered at the remotest points back next to the member 17, and when the member 16 is filled then its latch 80 is unfastened from the socket member 81 and said member 16 pushed toward the front part of the truck or until the wedging head 67 carried by the carrier member 18 engages the cam surface of the stop member 105 secured to the track 10 immediately adjacent the driver's seat. The parts will then be in the positions shown in Fig. 1 and the remaining articles to be delivered may be piled upon the platform constituting the carrier member 15 for delivery at those points nearest the store. In like manner the carrier member 120 in the lower level of the truck body is filled with articles to be delivered at the remote points of the route, and then the said member 120 is rolled toward the driver's seat or to the position shown in Fig. 1 where the same may be secured by means of the latch 134, engaging the socket member 135 therefor. Then the remaining articles for delivery, at nearer points on the route of the truck, can be deposited on the floor 2 of the truck body between the carrier member 120 and the rear doors 90.

From the foregoing it will thus be seen that there is provided a construction adapted for any type of delivery means which will have individual members connected together and yet telescopic. Further, these members are independently supported, or, in other words, each of the members 15, 16 and 18 are supported by the rollers associated therewith and the track 10 upon which they travel. Further, the members 15, 16 and 18 are capable of being secured in limited predetermined positions relative to the walls of the vehicle, by their associated latch members. Another feature of this invention resides in the fact that one of the members 18 is supplied with a depending wedge member adapted to cooperate with the stop members rigidly secured in predetermined positions to the track 10. Of course it is to be understood that the positions of the stop members 105 and 106 will be determined by the length of the truck body to which this invention is applied, and therefore the distances between these said members may be different for different trucks, but when the positions of these stop members are once determined for any particular truck, the position of said stop members will not be changed.

It is obvious that those skilled in the art may vary the details of construction as well as arrangements of parts without departing from the spirit of the invention and therefore it is not desired to be limited to the above disclosure except as may be demanded by the claims.

What is claimed is:

1. In equipment for delivery means provided with walls, the combination of a track; a guard rail; a plurality of carrier members adapted to travel on said track; means cooperating with said guard rail to keep said members on said track; means to secure said members in predetermined positions relative to said walls; and means to secure one of said members to said track.

2. In equipment for delivery means provided with walls, the combination of a track; a guard rail; a plurality of independently supported carrier members adapted to travel on said track; means cooperating with said guard rail to keep said members on said track; means to secure said members in predetermined positions relative to said walls; and means to secure one of said members to said track.

3. In equipment for delivery means provided with walls, the combination of a track; a guard rail; a plurality of telescopic carrier members adapted to travel on said track; means cooperating with said guard rail to keep said members on said track; means to secure said members in predetermined positions relative to said walls; and means to secure one of said members to said track.

4. In equipment for delivery means provided with walls, the combination of a track; a guard rail; a plurality of independently supported telescopic carrier members adapted to travel on said track; means carried by said members and cooperating with said guard rail to keep said members on said track; means to secure said members in predetermined positions relative to said walls; and means to secure one of said members to said track.

5. In equipment for delivery means provided with walls, the combination of a track; a guard rail; a plurality of connected, independently supported carrier members adapted to travel on said track; means comprising a plurality of bearings cooperating with said guard rail to keep said members on said track; means to secure said members in predetermined positions relative to said walls; and means to secure one of said members to said track.

6. In equipment for delivery means provided with walls, the combination of a track; a guard rail; a plurality of carrier members adapted to travel on said track; means cooperating with said guard rail to keep said members on said track; means to secure said members in predetermined positions relative to said walls; and means to secure in limited predetermined position one of said members to said track.

7. In equipment for delivery means provided with walls, the combination of a track; a guard rail; a plurality of carrier members adapted to travel on said track; means cooperating with said guard rail to keep said members on said track; means to secure said members in predetermined positions relative to said walls; and means to automatically secure one of said members to said track, when a predetermined distance has been travelled by said member.

8. In equipment for delivery means provided with walls, the combination of a track supported by said walls; a guard rail disposed above said track; a plurality of carrier members provided with wheels adapted to travel on said track; means cooperating with said guard rail to keep said members on said track; means to secure said members in predetermined positions relative to said walls; and means to secure one of said members to said track.

9. In equipment for delivery means provided with walls, the combination of a track supported by said walls; a guard rail disposed above said track and likewise supported by said walls; a plurality of wheeled carrier members separately supported and adapted to travel on said track; means comprising rollers cooperating with said guard rail to keep said members on said track; means to secure said members in predetermined positions relative to said walls; and means to secure one of said members to said track.

10. In equipment for delivery means provided with walls, the combination of a track; a guard rail; a plurality of carrier members adapted to travel on said track; means cooperating with said guard rail to keep said members on said track; means to secure said members in predetermined positions relative to said walls; and frictional means to secure one of said members to said track.

11. In equipment for delivery means provided with walls, the combination of a track; a guard rail; a plurality of carrier members adapted to travel on said track; means cooperating with said guard rail to keep said members on said track; means to secure said members in predetermined positions relative to said walls; and frictional means comprising cooperating cam surfaces to secure one of said members to said track.

12. In equipment for delivery means provided with walls, the combination of a track; a guard rail; a plurality of carrier members adapted to travel on said track; means cooperating with said guard rail to keep said members on said track; means to secure said members in predetermined positions relative to said walls; and frictional means including a stop member rigidly secured in predetermined position to said track to secure one of said carrier members to said track.

13. In equipment for delivery means provided with walls, the combination of a track; a guard rail; a plurality of carrier members adapted to travel on said track; means cooperating with said guard rail to keep said members on said track; means to secure said members in predetermined positions relative to said walls; and means comprising a stop member rigidly secured in predetermined position to said track, and adapted to be engaged by a cam carried by one of said members to secure said member to said track.

In testimony whereof I affix my signature.
ROBERT E. GREENE.